United States Patent [19]

Whiteman

[11] Patent Number: 4,743,221
[45] Date of Patent: May 10, 1988

[54] CENTRIFUGAL CLUTCH BELT TIGHTENING ASSEMBLY

[76] Inventor: Marvin E. Whiteman, 1923 Sprinbrook La., Boise, Id. 83706

[21] Appl. No.: 28,538

[22] Filed: Mar. 20, 1987

[51] Int. Cl.⁴ .............................................. F16H 11/06
[52] U.S. Cl. ........................................................ 474/13
[58] Field of Search ................................ 474/13, 32–35

[56] References Cited

U.S. PATENT DOCUMENTS

| | | | |
|---|---|---|---|
| 2,104,074 | 1/1938 | Erbach | 474/13 |
| 2,253,634 | 8/1941 | Mack | 474/13 |
| 2,508,558 | 5/1950 | Wolff | 474/38 |
| 3,269,200 | 8/1966 | Vaughn et al. | 474/38 X |
| 3,313,169 | 4/1967 | Peters | 474/13 |
| 3,618,414 | 11/1971 | Ruprecht | 474/45 |
| 3,747,721 | 7/1973 | Hoff | 474/13 X |
| 3,824,867 | 7/1974 | Brooks | 474/13 |
| 3,850,050 | 11/1974 | Lemmens | 474/13 X |
| 4,102,214 | 7/1978 | Hoff | 474/13 |
| 4,364,735 | 12/1982 | Plamper | 474/13 X |
| 4,384,862 | 5/1983 | Nakane | 474/13 |

FOREIGN PATENT DOCUMENTS 866550 4/1961 United Kingdom .

*Primary Examiner*—George A. Suchfield
*Assistant Examiner*—Thuy M. Bui
*Attorney, Agent, or Firm*—Laubscher & Laubscher

[57] ABSTRACT

An automatic variable speed centrifugal clutch belt tightening assembly is characterized by even transmission of rotational drive to a pair of belts and includes a rotating spindle and clutch plate having an adjustable centrifugally operable belt tightening mechanism. The belt tightening mechanism includes a clutch drum and a spacer which define recesses for receiving the belts to be driven. The spacer is mounted on the spindle by a bearing assembly affording free rotational and limited longitudinal movement relative to the spindle. As the spindle rotates, the clutch drum presses the spacer against a flange of the spindle to evenly drive the belts while compensating for differences in belt size.

10 Claims, 3 Drawing Sheets fig
CENTRIFUGAL CLUTCH BELT TIGHTENING ASSEMBLY

BACKGROUND OF THE INVENTION

The present invention relates to a centrifugal clutch belt tightening assembly for transmitting power equally through two belts. The assembly is particularly suited for transmitting drive forces to a rotary trowel used for finishing concrete.

BRIEF DESCRIPTION OF THE PRIOR ART

Centrifugally operable clutches, torque converters, and belt tightening devices are well-known in the patented prior art as evidenced by Erbach U.S. Pat. No. 2,104,074, Wolff U.S. Pat. No. 2,508,558 and Vaughn U.S. Pat. No. 3,269,200 and by the British Pat. No. 866,550. Although most prior devices are of the single belt type, the Erbach patent discloses an automatic clutch for multiple belt drives. The Erbach clutch includes a floating annular section having V-belts on either side thereof and an axially displaceable annular section which is driven by another V-belt. Rotation of an input shaft causes weights to be displaced radially outwardly to axially displace the annular section against the floating section to take up the slack and drive the belts.

While the prior devices normally operate satisfactorily, they possess certain inherent drawbacks. The Erbach device, for example, requires that one of the belts be in constant contact with the drive mechanism, which results in uneven wear of the belts of the multibelt system. Furthermore, the Erbach clutch requires a constant speed for operation, limiting the applications and versatility of the device.

In the clutch disclosed in the Wolff patent, automatic operation is not possible. Rather a handle must be manually operated to engage the clutch. Furthermore, the sliding pulley of the Wolff clutch is keyed to the hub of the clutch sheaves resulting in excessive wear on the belts unless both are driven. Finally, because sheave spacing is fixed when the clutch is operated, variance between belt lengths of multiple belts is not allowed.

In the pulley disclosed in the Vaughn patent, an outside power source is required to displace the pulley to grip the belt.

The present invention was developed in order to overcome these and other drawbacks of the prior devices by providing an automatic belt tightening device which is capable of transmitting equal power through two belts without slippage. The belt tightener is operable at variable speeds and in particular, at lower speeds than is possible with conventional belt tighteners which is particularly important for application to a rotary trowel. Furthermore, the belt tightener of the present invention is self-compensating for belt stretch or for various belt sizes, thereby maintaining maximum power delivery which minimizes belt wear.

SUMMARY OF THE INVENTION

Accordingly, it is a primary object of the present invention to provide a variable speed centrifugal clutch belt tightening assembly for transmitting power equally to a plurality of belts. The assembly includes a spindle adapted for rotation about a longitudinal axis and having a cylindrical portion and an annular flange portion extending outwardly from one end of the cylindrical portion. A clutch plate is connected with the other end of the spindle cylindrical portion for rotation with the spindle about the longitudinal axis. A belt drive mechanism is mounted on the spindle between the flange portion and the clutch plate. The drive mechanism includes a clutch drum slidably connected with the cylindrical portion and rotatably driven about the longitudinal axis by the clutch plate, at least one spacer freely mounted on the cylindrical portion in spaced relation between the clutch drum and the flange portion for defining annular recesses for receiving the belts, and a plurality of weights arranged between the clutch plate and the clutch drum. As the spindle rotates, the weights move radially outwardly in response to centrifugal force and displace the clutch drum longitudinally toward the spacers and the flange portion to compress the spacers evenly against the belts, whereby the rotation of the spindle is evenly transmitted to the belts to drive the belts at equal speeds.

According to a further object of the invention, the displacement of the clutch drum can be adjusted in accordance with the rotational speed of the spindle, whereby the assembly is operable at variable speeds.

According to a more specific object of the invention, the spacer is mounted on the spindle cylindrical portion by bearings which afford rotational and longitudinal movement of the spacer relative to the spindle.

It is another object of the invention to provide longitudinal grooves in the spindle cylindrical portion for receiving the bearings, whereby the longitudinal movement of the spacer is limited to the length of the grooves.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
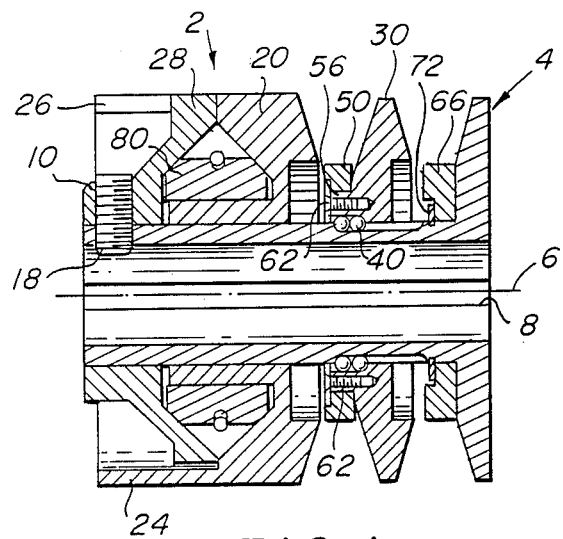
FIG. 1 is a sectional view of the variable speed centrifugal clutch belt tightening assembly according to the invention.

The variable speed centrifugal clutch belt tightening assembly according to the invention is shown in its assembled condition in FIG. 1, with the individual components thereof being illustrated in greater detail in the remaining figures. Unless otherwise noted, the individual assembly components are all formed of a rigid material such as aluminum or cast iron.

Figure 2A:
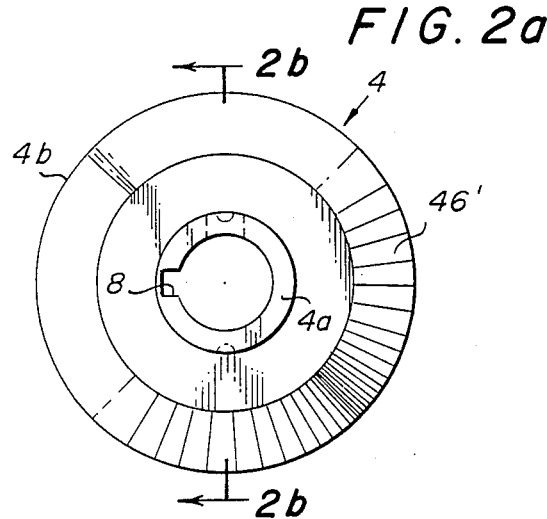
FIGS. 2a and 2b are front and side sectional views, respectively, of the assembly spindle.
Figure 2B:
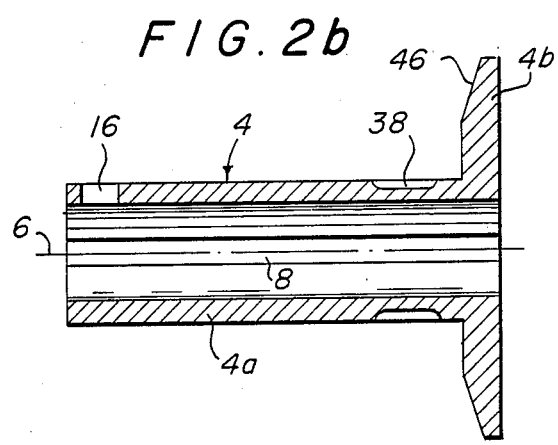

The assembly 2 includes a spindle 4 (shown more particularly in FIGS. 2a and 2b) having a cylindrical portion 4a and a flange portion 4b extending radially outwardly from one end of the cylindrical portion.

The spindle is adapted for mounting on a rod which is rotated by an engine (not shown) about a longitudinal axis 6, the axis of the spindle cylindrical portion corresponding with the axis of rotation. The inner surface of the spindle cylindrical portion 4a contains a keyway 8 which is adapted to receive a key on the engine rod, whereby the spindle is rotated with the rod.

Figure 9A:
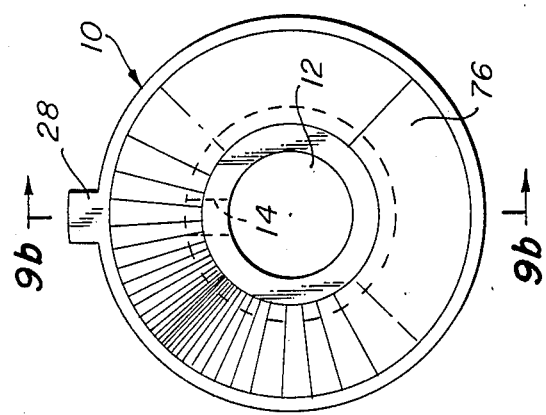
FIGS. 9a and 9b are front and side sectional views of the clutch plate of the assembly.
Figure 9B:
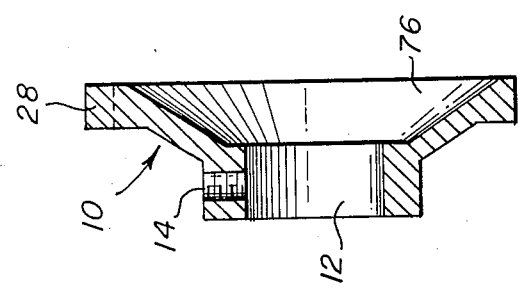

A clutch plate 10 shown more particularly in FIGS. 9a and 9b is mounted on the free end of the spindle cylindrical portion spaced from the spindle flange. The clutch plate has a generally annular configuration and contains a central opening 12 having a diameter corresponding with the outer diameter of the spindle cylindrical portion. The clutch plate includes a radial threaded opening 14 which is aligned with a similar opening 16 in the end of the spindle cylindrical portion for receiving a set screw 18 as shown in FIG. 1. The set screw fixes the clutch plate on the spindle, whereby the plate rotates with the spindle about the longitudinal axis. The set screw also prevents longitudinal displacement of the clutch plate relative to the spindle.

Figure 7A:
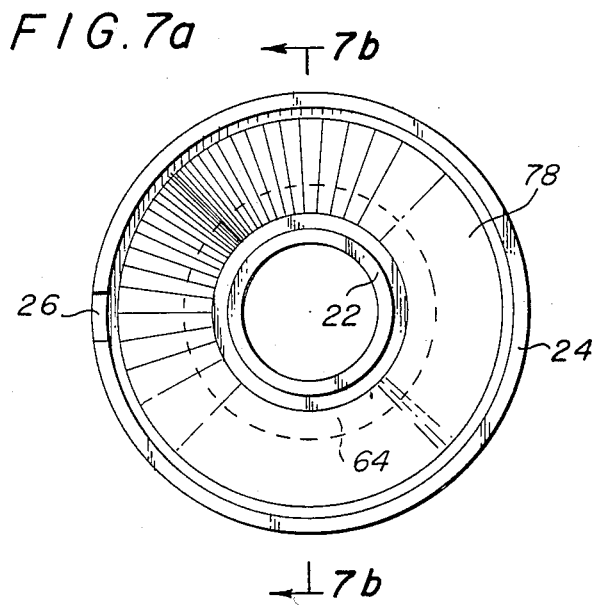
FIGS. 7a and 7b are front and side sectional views, respectively, of the clutch drum of the assembly.
Figure 7B:
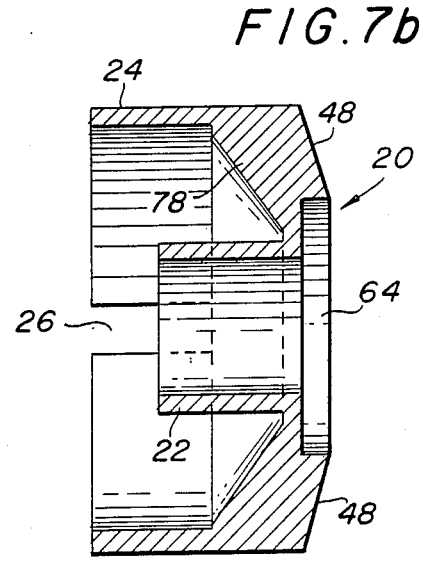

A clutch drum 20 is slidably connected with the spindle cylindrical portion adjacent the clutch plate 10 and between the clutch plate and the spindle flange portion. As shown more particularly in FIGS. 7a and 7b, the clutch drum includes inner and outer spaced cylindrical portions 22, 24 extending toward the clutch plate. The inner portion 22 has an inner diameter slightly greater than the outer diameter of the spindle cylindrical portion 4a, thereby affording longitudinal movement of the drum relative to the spindle. The outer cylindrical portion 24 contains a longitudinal slot or opening 26 which is adapted to receive a projection tab 28 which extends from the outer annular surface of the clutch plate as shown in FIG. 1. With the clutch plate tab 28 arranged in the clutch drum slot 26, the clutch plate is rotated about the longitudinal axis with the spindle and the clutch plate.

Figure 11:
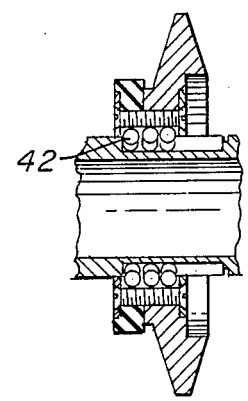
FIG. 11 is a sectional view of an alternate bearing mounting assembly for the spacer.
Figure 5A:
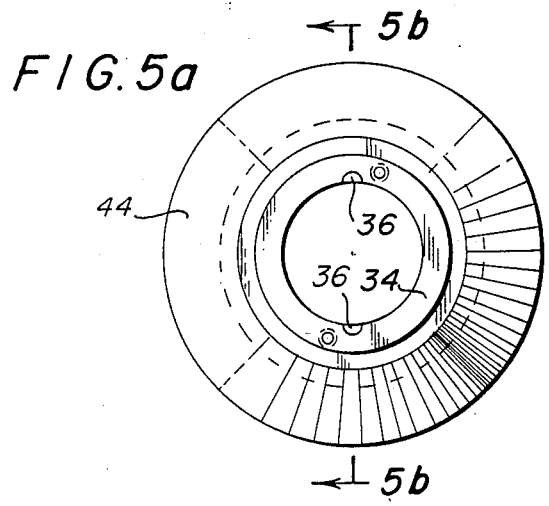
FIGS. 5a and 5b are front and side sectional views, respectively, of the spacer of the assembly.
Figure 5B:
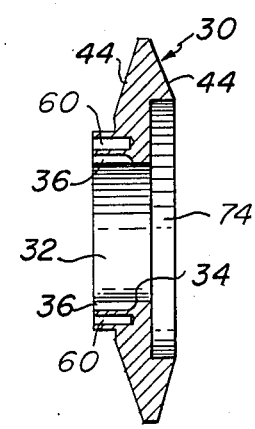

At least one annular floating clutch pulley or spacer 30 is freely mounted on the spindle cylindrical portion between the clutch drum 20 and the spindle flange portion 4b. Referring to FIGS. 5a and 5b, the spacer has an annular configuration and contains a central opening 32 having a diameter slightly greater than the outer diameter of the spindle cylindrical portion. A bearing assembly is provided to mount the spacer on the spindle, whereby the spacer may rotate relative to the spindle as well as be displaced longitudinally of the spindle cylindrical portion. More particularly, the inner circumferential wall 34 of the spacer contains a pair of opposed grooves 36. Similarly, the outer circumferential wall of the spindle cylindrical portion 4a contains a circumferential recess 38 having a longitudinal dimension which defines the distance of longitudinal displacement afforded to the spacer relative to the spindle. As shown in FIG. 1, spherical balls 40 are arranged in the void defined between the spacer grooves 36 and the spindle recess 38. The balls or ball bearings enable the spacer to be rotated about the spindle and the spindle recess 38 allows the ball bearings and thus the spacer to be displaced along a limited length of the spindle cylindrical portion. In lieu of the ball bearing mounting arrangement of the spacer shown in FIG. 1, a roller bearing assembly may be used as shown in FIG. 11 wherein rollers 42 are arranged in separate grooves in the spacer.

Referring once again to FIG. 1, the spacer defines a pair of annular recesses on either side thereof which are adapted to receive two belts (not shown), respectively, which are to be driven by the clutch assembly. Of course, additional spacers may be provided where additional belts are to be driven. The spacer preferably has tapered surfaces 44. Similarly, the spindle flange portion 4b has a tapered surface 46 facing the spacer and the clutch drum has a tapered surface 48 facing the spacer. The tapered surfaces thus define tapered recesses for receiving V-belts.

Figures 3A, 3B:
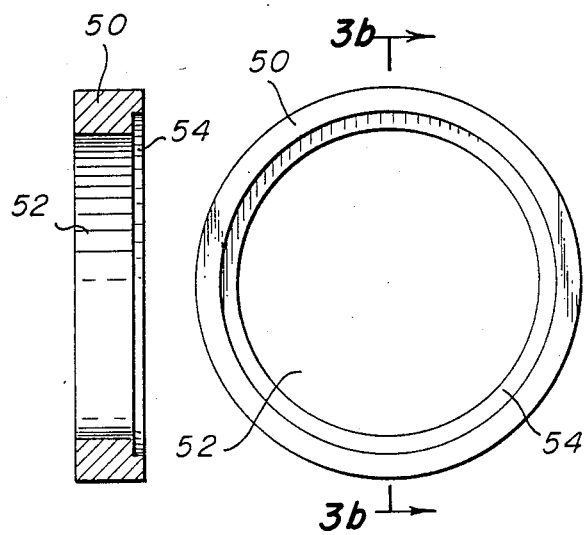
Figure 6B:
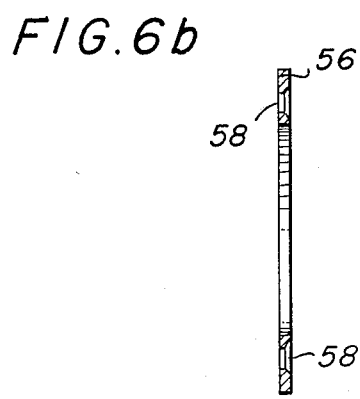
FIGS. 6a and 6b are front and side sectional views, respectively, of the bearing retainer of the assembly.
Figure 6A:
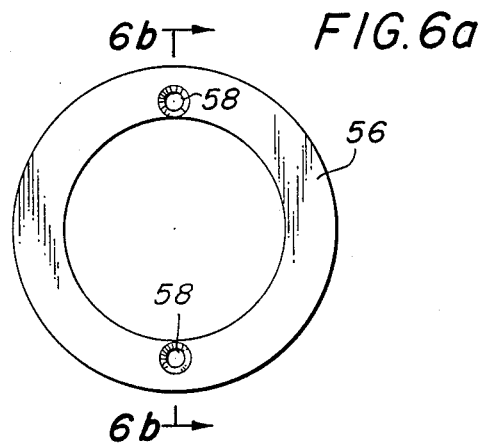

A first annular belt runner 50 is connected with one side of the spacer to support the belt arranged in a first recess. As shown in FIGS. 3a and 3b, the first belt runner contains a central opening having portions of smaller and larger diameters 52, 54. The larger diameter portion of the first runner opening receives an annular bearing retainer ring 56 shown in FIGS. 6a and 6b. This ring contains openings 58 aligned with threaded openings 60 in the spacer for receiving screws 62 which connect the ring 56 and the runner 50 with the spacer, thereby to retain the bearing balls 40 in the spacer grooves 36. As will be developed in greater detail below, the clutch drum 20 contains a circular recess 64 in the surface facing the spacer for receiving the first belt runner 50.

Figures 4A, 4B:
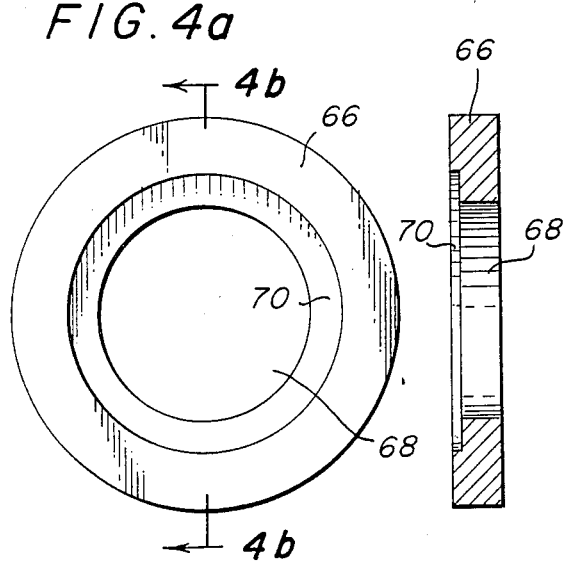
FIGS. 3a and 3b and 4a and 4b are front and side sectional views of first and second belt runners of the assembly, respectively.

A second annular belt runner 66 is connected with the spindle 4 adjacent the flange portion 4b thereof. The second belt runner is shown more particularly in FIGS. 4a and 4b and contains a central opening having a first portion 68 whose diameter corresponds with the outer diameter of the spindle cylindrical portion and a second portion 70 whose diameter is greater than that of the first portion for receiving a snap ring 72 for connecting the second belt runner with the spindle. As will be developed below, the spacer contains a circular recess 74 in the surface facing the spindle flange portion 4b for receiving the second belt runner 66.

Figure 8B:
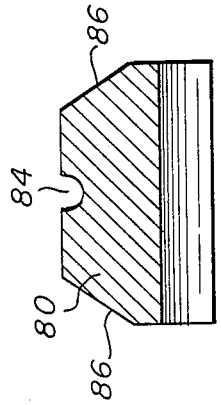
FIGS. 8a, 8b, and 8c are front, side sectional, and top views, respectively, of a weight of the assembly.
Figure 8C:
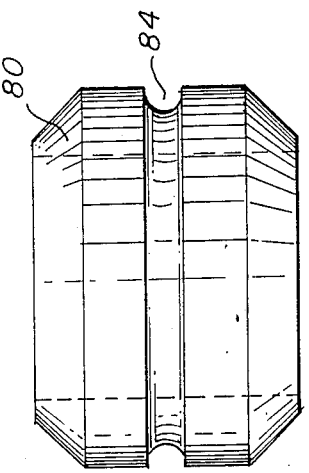
Figure 8A:
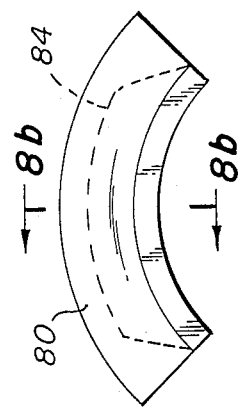
Figure 10:
FIG. 10 is a plan view of a weight retainer coil spring.

As shown in FIG. 1, the clutch plate 10 and clutch drum 20 have inclined opposed surfaces 76, 78 respectively, which define with the clutch drum inner cylindrical portion 22 an annular chamber having a generally triangular cross-sectional configuration. Arranged within the chamber are at least two arcuately shaped weights 80 shown more particularly in FIGS. 8a, 8b, and 8c. With the spindle, clutch plate, and clutch drum at rest, the weights 80 are mounted on the clutch drum inner cylindrical portion 22 and retained thereon by a circumferentially arranged coil spring 82 (FIG. 10) which is seated in grooves 84 in the upper surface of the weights 80. As best shown in FIG. 8b, each weight includes inclined surfaces 86 which cooperate with the inclined surfaces 76, 78 of the clutch plate and clutch drum respectively.

In operation, the belts are loosely arranged in the recesses on either side of the spacer 30. Upon rotation of the motor rod, the spindle 4, clutch plate 10, and clutch drum 20 rotate together as a unit, with the weights 80 initially resting on the clutch drum inner cylindrical surface. Rotation of the weights generates centrifugal forces against the force of the coil spring 82. The weights move radially outwardly within the chamber as rotational speed increases. The inclined surfaces of the weights press on the inclined surfaces of the clutch plate and clutch drum. Since the clutch plate is fixed relative to the spindle, the clutch drum is longitudinally displaced toward the spacer.

Some rotational drive is transmitted to the spacer from the spindle via the bearings. As the clutch drum is displaced toward the spacer, the spacer is similarly displaced toward the spindle flange portion, with the bearing runners entering the recesses provided in the clutch drum and spacer, respectively. The V-belts in the recesses are subsequently engaged by the walls of the clutch drum, spacer, and spindle flange portion. Owing to the unique bearing mounting arrangement for the spacer, the rotational drive transmitted from the spindle is evenly distributed to the belts.

By substituting weights of greater or lesser value, the rotational speed at which the clutch operates may be adjusted. Similarly, the substitution of coil springs of different elasticity may also be used to adjust the operation of the clutch and belt tightening assembly.

The novel bearing mounting arrangement for the spacer enables the variable clutch belt tightening assembly of the invention to transmit more power without slippage. Furthermore, adjustment of the weights and coil spring enables the clutch to operate off of engines having up to 15 horsepower which enables the device to transmit a greater output to the load, such as a rotary trowel. Moreover, the bearing mounted spacer eliminates the need for critical sizing of the belts to be driven since the assembly is self-compensating as to belt thickness. The device is thus capable of automatically evenly driving at least two belts which may be of different sizes or have different degrees of stretch. Finally, since the sliding clutch drum is coupled to the spindle, excessive wear on the belts is prevented when the angular velocity is increased to longitudinally displace the clutch drum and the spacer.

While in accordance with the provisions of the patent statutes the preferred forms and embodiments of the invention have been illustrated and described, it will be apparent to those skilled in the art that various changes and modifications may be made without deviating from the inventive concepts set forth above.

What is claimed is:

1. A variable speed centrifugal clutch belt tightening assembly for transmitting power equally to at least a pair of belts, comprising
   (a) a spindle driven for rotation about a longitudinal axis, said spindle including a hollow cylindrical portion having an axis corresponding with said longitudinal axis and an annular flange portion extending outwardly from one end of said cylindrical portion;
   (b) a clutch plate connected with the other end of said spindle cylindrical portion for rotation therewith;
   (c) means mounted on said spindle between said spindle flange portion and said clutch plate for transmitting rotational drive forces from said spindle to at least a pair of belts, said belt drive transmission means including
      (1) a clutch drum slidably connected with said spindle cylindrical portion and including means connected with said clutch plate for rotatably driving said clutch drum about said longitudinal axis with said clutch plate;
      (2) spacer means freely mounted on said spindle cylindrical portion in spaced relation between said clutch drum and said spindle flange portion for defining annular recesses for receiving the belts, respectively; and
      (3) means for displacing said clutch drum in the longitudinal direction toward said spacer means and said spindle flange portion to compress said spacer means evenly against the belts, whereby the rotation of said spindle is evenly transmitted to the belts to drive the belts at equal speeds.

2. Apparatus as defined in claim 1, wherein said spacer means include bearing means for mounting said spacer means on said spindle, said bearing means affording rotational and longitudinal movement of said spacer means relative to said spindle.

3. Apparatus as defined in claim 2, wherein said spindle cylindrical portion contains an annular groove for receiving said bearing means.

4. Apparatus as defined in claim 3, wherein said displacing means are operable in response to centrifugal forces generated by rotation of said spindle.

5. Apparatus as defined in claim 4, wherein said centrifugal force displacing means are adjustable to vary the degree of displacement of said clutch drum relative to the speed of rotation of said spindle.

6. Apparatus as defined in claim 5, wherein said centrifugal force displacing means comprises at least a pair of weights arranged between said clutch plate and said clutch drum, and further wherein said clutch drum and said weights have tapered contiguous surfaces, whereby as said weights move radially outwardly relative to said spindle cylindrical portion in response to the centrifugal force, said weights displace said clutch drum longitudinally in the direction of said spacer means and said spindle flange portion.

7. Apparatus as defined in claim 6, wherein said centrifugal force displacing means further comprises a spring mounted about said weights for biasing said weights against the centrifugal force.

8. Apparatus as defined in claim 7, wherein said weights have an arcuate configuration for mounting on a clutch drum cylindrical portion when said spindle is stationary, each of said weights containing a groove for receiving said spring.

9. Apparatus as defined in claim 8, and further comprising annular belt runner means mounted on said spindle cylindrical portion in the recesses defined by said spacer means for supporting the belts arranged within said recesses, said runner means having an outer diameter less than said spacer means.

10. Apparatus as defined in claim 9, wherein said clutch drum, said spacer means, and said spindle flange portion have tapered side walls, whereby said recesses have a tapered configuration for receiving V-belts.

* * * * *